US012682318B2

(12) United States Patent
Arneault

(10) Patent No.: US 12,682,318 B2
(45) Date of Patent: Jul. 14, 2026

(54) NON-FUNGIBLE TOKENS FOR TRACKING FUNGIBLE ASSETS

(71) Applicant: Texas High Tech Holdings, Inc., Houston, TX (US)

(72) Inventor: Jonathan Arneault, Gulf Breeze, FL (US)

(73) Assignee: Texas High Tech Holdings, Inc., Houston, TX (US)

( * ) Notice: Subject to any disclaimer, the term of this patent is extended or adjusted under 35 U.S.C. 154(b) by 0 days.

(21) Appl. No.: 18/610,730

(22) Filed: Mar. 20, 2024

(65) Prior Publication Data

US 2024/0242180 A1 Jul. 18, 2024

Related U.S. Application Data

(63) Continuation of application No. 17/722,971, filed on Apr. 18, 2022, now abandoned.

(Continued)

(51) Int. Cl.
G06Q 10/087 (2023.01)

(52) U.S. Cl.
CPC ....... G06Q 10/087 (2013.01); G06Q 2220/00 (2013.01)

(58) Field of Classification Search
CPC ......................... G06Q 10/087; G06Q 2220/00
See application file for complete search history.

(56) References Cited

U.S. PATENT DOCUMENTS

2003/0195708 A1    10/2003  Brown
2004/0019437 A1     1/2004  Kelemen et al.

(Continued)

FOREIGN PATENT DOCUMENTS

WO        2020145887 A2    7/2020
WO        2020/245280 A1   12/2020
WO        2021/250045 A1   12/2021

OTHER PUBLICATIONS

NPL: (de Oliveira) Luís Pereira de Oliveira, Jan J. Verstraete, Max Kolb, Simulating vacuum residue hydroconversion by means of Monte-Carlo techniques, Catalysis Today, vols. 220-222 (2014) pp. 208-220 (Year: 2014).*

(Continued)

*Primary Examiner* — Florian M Zeender
*Assistant Examiner* — Kimberly S. Bursum
(74) *Attorney, Agent, or Firm* — Banner & Witcoff, Ltd.

(57) ABSTRACT

The present disclosure describes creating and managing one or more tokens (e.g., non-fungible tokens) to represent one or more chemical properties, elemental properties, elemental components, parametric components, and/or molecular components of a resource (e.g. a commodity). The tokens may create an immutable record of a property right of the chemical properties, elemental properties, elemental components, parametric components, and/or molecular components of a resource. As the resource traverses its lifecycle, the tokens may be decremented—or otherwise updated, changed, modified, or altered—as the resource is parsed and/or refined. Based on one or more changes to the chemical composition of the resource, one or more additional tokens may be generated to indicate the one or more changes. When the resource is consumed (e.g., burned as fuel) or sequestered (e.g., used to make plastic), the tokens may be destroyed.

20 Claims, 5 Drawing Sheets

Related U.S. Application Data

(60) Provisional application No. 63/181,293, filed on Apr. 29, 2021.

(56) References Cited

U.S. PATENT DOCUMENTS

| | | | |
|---|---|---|---|
| 2005/0223004 | A1 | 10/2005 | McKenney et al. |
| 2005/0246316 | A1 | 11/2005 | Lawson et al. |
| 2005/0267723 | A1 | 12/2005 | Hearn et al. |
| 2007/0012784 | A1 | 1/2007 | Mercolino |
| 2012/0290223 | A1 | 11/2012 | Mertens |
| 2013/0185044 | A1 | 7/2013 | Chen et al. |
| 2014/0231641 | A1 | 8/2014 | Qian et al. |
| 2018/0068359 | A1* | 3/2018 | Preston .............. G06Q 30/0283 |
| 2018/0165416 | A1* | 6/2018 | Saxena .................. G16H 50/20 |
| 2018/0307803 | A1 | 10/2018 | Watanasiri et al. |
| 2019/0279204 | A1* | 9/2019 | Norton .............. G06Q 20/3825 |
| 2019/0303846 | A1* | 10/2019 | Kaweske .............. G16H 20/10 |
| 2019/0340623 | A1 | 11/2019 | Rivkind et al. |
| 2020/0042671 | A1 | 2/2020 | Martin et al. |
| 2020/0104465 | A1 | 4/2020 | Martin et al. |
| 2020/0118117 | A1 | 4/2020 | McManus et al. |
| 2020/0134760 | A1 | 4/2020 | Messerges et al. |
| 2020/0252404 | A1 | 8/2020 | Padmanabhan |
| 2020/0267151 | A1 | 8/2020 | Wells et al. |
| 2020/0342539 | A1 | 10/2020 | Doney |
| 2020/0349532 | A1 | 11/2020 | Brown et al. |
| 2020/0351094 | A1 | 11/2020 | Canterbury et al. |
| 2020/0403808 | A1 | 12/2020 | Smith et al. |
| 2021/0149958 | A1* | 5/2021 | Hunter ..................... G06N 3/08 |
| 2021/0256016 | A1 | 8/2021 | Gramoli et al. |
| 2021/0272037 | A1 | 9/2021 | Hanebeck |
| 2021/0390549 | A1* | 12/2021 | Rule .................... G06Q 20/403 |
| 2022/0094692 | A1 | 3/2022 | Wolohan, Jr. et al. |
| 2022/0101277 | A1 | 3/2022 | Banatao et al. |
| 2022/0222610 | A1 | 7/2022 | Hall et al. |
| 2023/0028555 | A1 | 1/2023 | Cameron |

OTHER PUBLICATIONS

Mar. 5, 2021, IBM Molecule Generation Experience: Supercharging new materials design with AI and Hybrid Cloud, Seiji Takeda.

Jan. 28, 2021, IBM RXN: New AI Model Boosts Mapping of Chemical Reactions., Philippe Schwaller and Teodoro Laino.

Aug. 26, 2020, RoboRXN: Automating Chemical Synthesis, Teodoro Laino.

Apr. 5, 2022, IBM RXN for Chemistry, The free AI Tool in the Cloud for Digital Chemistry.

Jul. 7, 2021, Chemical Reviews, Combining Machine Learning and Computational Chemistry for Predictive Insights into Chemical Systems, John A. Keith, Valentin Vassilev-Galindo, Bingqing Cheng, Stefan Chmiela, Michael Gastegger, Klaus-Robert Muller and Alexandre Tkatchenko.

Rezende, M.; Vale, D.; Aguiar, P.; Riehl, C.; Azevedo, D. Application of Full Factorial Design to Evaluate the Effect of Different Variables on the Stability of Biodiesel :Diesel Blends under Storage Conditions. Journal of the Brazilian Chemical Society 2017, 28 ( 10), 1966-1974.

Takhar, S.S.; Liyanage, K. Blockchain Application in Supply Chain Chemical Substance Reporting. In 22nd Cambridge International Manufacturing Symposium; Cambridge, UK, 2018; pp. 1-21.

Linke, 0. T.; Kaner, D.; Patra, S.; Kaser, S.; Meuwly, M. High-Dimensional Potential Energy Surfaces for Molecular Simulations: From Empiricism to Machine Learning. Machine Learning: Science and Technology 2020, 1, 013001:1-22.

Wang, L.; Beeson, D.; Akkaram, S.; Wiggs, G. Gaussian Process Meta-Models for Efficient Probabilistic Design in Complex Engineering Design Spaces. In ASME 2005 International Design Engineering Technical Conferences and Computers and Information in Engineering Conference; ASMEDC: Long Beach, California, USA, 2005; vol. vol. 2: 31st Design Automation Conference, Parts A and B, pp. 785-798.

Jul. 19, 2022, Office Action of related U.S. Appl. No. 17/722,906.

Jul. 22, 2022, OA of U.S. Appl. No. 17/722,759.

Jul. 22, 2022—(WO) International Search Report and Written Opinion—PCT/US2022/025194.

Aug. 20, 2020, MDPI "Inventions" Article: Chemical and Physical Analysis of a Petroleum Hydrocarbon Contamination on a Soil Sample to Determine its National Degradation Feasaility by Kuruna Arjoon et al.

Sep. 12, 2022—(WO) International Search Report & Written Opinion—PCT/US2022/025192.

2014, de Oliveira, L. P.; Verstraete, J. J.; Kolb, M. Simulating Vacuum Residue Hydroconversion by Means of Monte-Carlo Techniques. Catalysis Today, 220-222, 208-220.

2007, Freund, H.; Walters, C. C.; Kelemen, S. R.; Siskin, M.; Gorbaty, M. L.; Curry, D. J.; Bence, A. E. Predicting Oil and Gas Compositional Yields via Chemical Structure-Chemical Yield Modeling (CS-CYM): Part 1—Concepts and Implementation. Organic Geochemistry, 38 (2), 288-305.

1997, Ohkawa, T.; Sasai, T.; Komada, N.; Murata, S.; Nomura, M. Computer-Aided Construction of Coal Molecular Structure Using Construction Knowledge and Partial Structure Evaluation. Energy & Fuels, 11 (5), 937-944.

2007, Walters, C. C.; Freund, H.; Kelemen, S. R.; Peczak, P.; Curry, D. J. Predicting Oil and Gas Compositional Yields via Chemical Structure-Chemical Yield Modeling (CS-CYM): Part 2—Application under Laboratory and Geologic Conditions. Organic Geochemistry, 38 (2), 306-322.

2015, Wang, H.; Sheen, D. A. Combustion Kinetic Model Uncertainty Quantification, Propagation and Minimization. Progress in Energy and Combustion Science, 47, 1-31.

2010, Verstraete, J.J.; Schnongs, Ph.; Dulot, H.; Hudebine, D. Molecular Reconstruction of Heavy Petroleum Residue Fractions, Chemical Engineering Science, 65 (1), 304-312.

2018, Li, Z; Wu, H.; King, B.; Ben Miled, Z.; Wassick, J.; Tazelaar, J. A Hybrid Blockchain Ledger for Supply Chain Visibility. In 2018 17th International Symposium on Parallel and Distributed Computing; IEEE, Geneva, pp. 118-125.

* cited by examiner

| Received Parameters | | | |
|---|---|---|---|
| Density 414.36 | | Sulfur 0.222807 | Viscosity 44.32 |
| Commodity Change State | | | |
| Seal Number 350545 | Product Type L380 | Product Grade RMG180 | Sample Method |
| Sample Point | Bunker Point | Location Port of Los Angeles | Drawn By |
| Quantity Received | Tank Quantity 922.09 | Data Sampled | Data Sent 2020-04-16 |
| Data Received 2020-04-17 | Data Tested 2020-04-18 | | |
| Current Parameter State | | | |
| Appearance Not Bright | Density 989.03 | Flash Point 60.32 | Pour Point F 56.27 |
| MCR0.133 | Sulfur 1.4935 | Viscosity 248.0 | UPP 15.0 |
| Total Sediment 0.08 | Water 0.47 | ASH 47.0 | Aluminum 66.0 |
| Silicon 28.0 | Al Sa 52.0 | Vanadium 296.0 | Sodium 70.0 |
| Magnesium A1 | Calcium A2 | Phosphorus A3 | Zinc A4 |

NON-FUNGIBLE TOKENS FOR TRACKING FUNGIBLE ASSETS

CROSS-REFERENCE TO RELATED APPLICATIONS

This application is a continuation of U.S. patent application Ser. No. 17/722,971, entitled "Non-Fungible Tokens for Tracking Fungible Assets" and filed on Apr. 18, 2022, which claims priority to U.S. Provisional Patent Application No. 63/181,293, entitled "Non-Fungible Tokens for Tracking Fungible Assets" and filed on Apr. 29, 2021, which are incorporated by reference herein in their entireties.

FIELD OF THE DISCLOSURE

Aspects of the disclosure generally relate to non-fungible tokens and more specifically to generating non-fungible tokens for fungible assets.

BACKGROUND OF THE DISCLOSURE

Mineral rights are property rights to explore an area or place for said minerals. In this regard, mineral rights may be separate from property rights to the area or the place. Due to technical limitations, an ownership right equivalent to that of mineral rights has not been created in resources (e.g., commodities), such as ores, raw material, etc. Accordingly, there is a need to create a property right in the chemical properties, elemental properties, elemental components, parametric components, and/or molecular components of resources that is separate from the ownership of the resource itself.

BRIEF SUMMARY OF THE DISCLOSURE

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, methods, and computer-readable media are also within the scope of the disclosure.

The present disclosure describes the creation of a token (e.g., cryptocurrency, a non-fungible token, etc.) associated with the chemical properties, elemental properties, elemental components, parametric components, and/or molecular components of a resource. The token may create and/or represent an immutable record of a property right of the chemical properties, elemental properties, elemental components, parametric components, and/or molecular components of a resource. As the resource traverses its lifecycle, the token may be decremented—or otherwise updated, changed, modified, or altered—as the resource is parsed and/or refined. In some examples, based on one or more changes to the chemical composition of the resource, one or more additional tokens may be generated to indicate the one or more changes, and such additional tokens would contain information regarding their source token(s). In the case where changes to the first token, or subsequent tokens, undergo further changes (including segregation, full or partial consumption, combination, additives, or other such changes), the first token, or the subsequent tokens, may be represented via the creation of new tokens while decrementing the prior tokens. Alternatively, a new token, which contains the prior token(s), may be created with the new information reflecting such changes. Ultimately, the token(s) may be destroyed, in whole or in part, for example, when the resource is consumed (e.g., burned as fuel) or sequestered (e.g., used to make plastic).

The features, along with many others, and benefits are discussed in greater detail below.

BRIEF DESCRIPTION OF THE DRAWINGS

The present disclosure is described by way of example and not limited in the accompanying figures in which:

FIG. 4 shows an example of analyzing a fungible asset to determine one or more chemical properties, elemental properties, elemental components, parametric components, and/or molecular components of the fungible asset in accordance with one or more aspects of the disclosure.

DETAILED DESCRIPTION OF THE DISCLOSURE

Figure 1A:
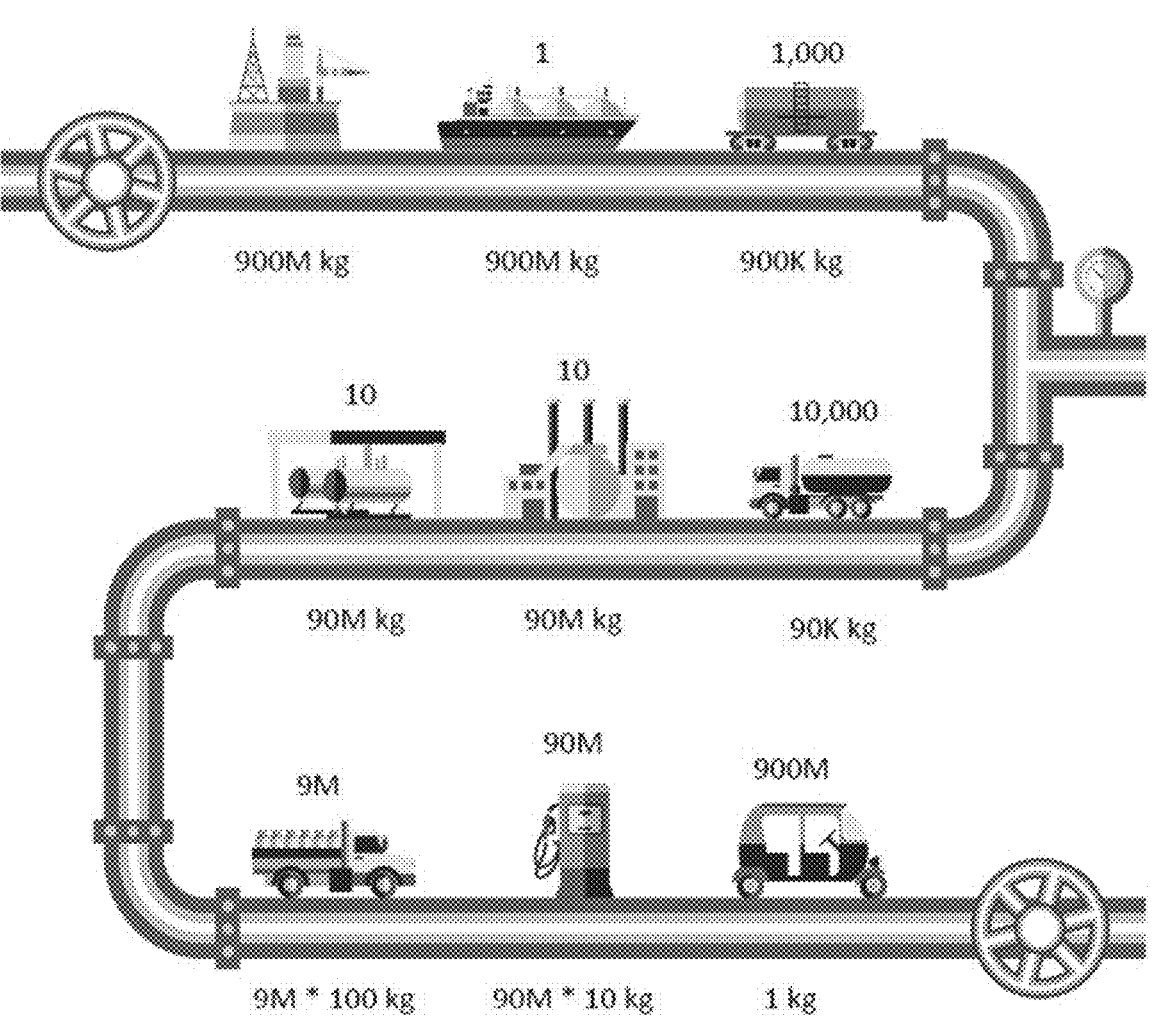
FIGS. 1A-1B show an example of a system for writing and updating data and/or information to a ledger in accordance with one or more aspects of the disclosure.

In the following description of the various example embodiments, reference is made to the accompanying drawings, which form a part hereof, and in which is shown by way of illustration various example embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may describe generating one or more tokens (e.g., cryptocurrency, a non-fungible token, etc.) associated with the chemical properties, elemental properties, elemental components, parametric components, and/or molecular components of a resource (e.g., a commodity, a fungible asset, etc.). In this regard, a ledger may be used to record a lifecycle of the resource. Accordingly, a first record may be created when the resource is harvested, mined, extracted, or first recovered or sourced, a second record may be created when the resource is transported from the extraction site to a processing site, such as a refinery. When the first record is created, one or more tokens may also be generated. The one or more tokens may represent one or more chemical properties, elemental properties, elemental components, parametric components, and/or molecular components of the resource. In this regard, the first record may be measured and/or analyzed to determine the chemical properties, elemental properties, elemental components, parametric components, and/or molecular components of the resource. For example, the resource may be petroleum, and the one or more tokens may represent the carbon, hydrogen, nitrogen, oxygen, sulfur, and/or metals contained in the petroleum. That is, a single token may collectively represent the carbon, hydrogen, nitrogen, oxygen, sulfur, and/or metals contained in the petroleum. Alternatively, a first token may represent the carbon, a second token may represent the hydrogen, a third token may represent the nitrogen, a fourth token may represent the oxygen, a fifth token may represent the sulfur, and/or a sixth token may represent the metals. As the resource is processed and/or consumed, the chemical composition of the resource may change. Accordingly, the one or more tokens may be updated and/or changed to represent the changes in the chemical composition of the resource. The updates and/or changes to the one or more tokens may comprise decrementing a value associated with the one or more tokens. In this regard, the one or more tokens may be decremented upon consumption of the resource, for example, based on the use of the elements and/or compounds consumption potential (e.g., normative versus physics potentials). Efficient consumption leaves in "non-destroyed potential," which may result in "non-total destruction" of the one or more tokens. When the resource is consumed, lost, or made into a final sequestered form, the one or more tokens may be destroyed so much as the consumed potential is.

Turning to FIG. 1A, an example of a lifecycle of a commodity and/or resource is shown. It will be appreciated that commodity and resource may be used interchangeably throughout this disclosure. The resource may comprise a raw material or primary agricultural product. The raw material may be petroleum, coal, oil, chemicals (e.g., such as those used in pharmaceuticals), minerals, metals, or any other fungible resource. It will be appreciated that the lifecycle of any resource may be tracked. The lifecycle of the resource, as shown in FIG. 1A, shows a quantity of containers and/or locations (e.g., offshore derricks, boats, containers, storage tanks, factories, trucks, gas stations, cars) that store the resource at different stages of transportation and/or distribution of the resource and a weight and/or quantity of the resource for each of the containers.

As an example, 900,000,000 kilograms (kg) of petroleum may be extracted at the outset. As will be discussed in greater detail below, a first record of the 900,000,000 kg of petroleum may be created and stored in a ledger. The first record may comprise data and/or information about the 900,000,000 kg of petroleum, including, for example, chemical properties, elemental properties, elemental components, parametric properties, and/or molecular properties of the petroleum, where the petroleum was extracted (e.g., location information), when the petroleum was extracted (e.g., date/time information), etc. The 900,000,000 kg of petroleum may be shipped, for example, from an offshore derrick to a port via a ship. Like the extraction noted above, a second record may be created. The second record may comprise data and/or information, such as an origin of the petroleum, a destination of the petroleum, a shipping route of the petroleum, a length of transit from the origin to the destination, weather conditions at the origin, weather conditions at the destination, weather conditions via the shipping route during the length of transit, etc., in addition to the information discussed above. As will be discussed in greater detail below, one or more applications associated with the technology platform described herein may analyze the data and/or information contained in the second record to determine if any changes occurred to the petroleum (e.g., resource) in transit. If the properties of the petroleum changed while en route, the application may cause a new record to be generated to update the properties of the petroleum. This process may be repeated as the petroleum is shipped by rail and/or truck to a refinery and then distributed to one or more retailers, until the petroleum is consumed (e.g., burned as fuel) or sequestered (e.g., used to manufacture plastics).

Figure 1B:
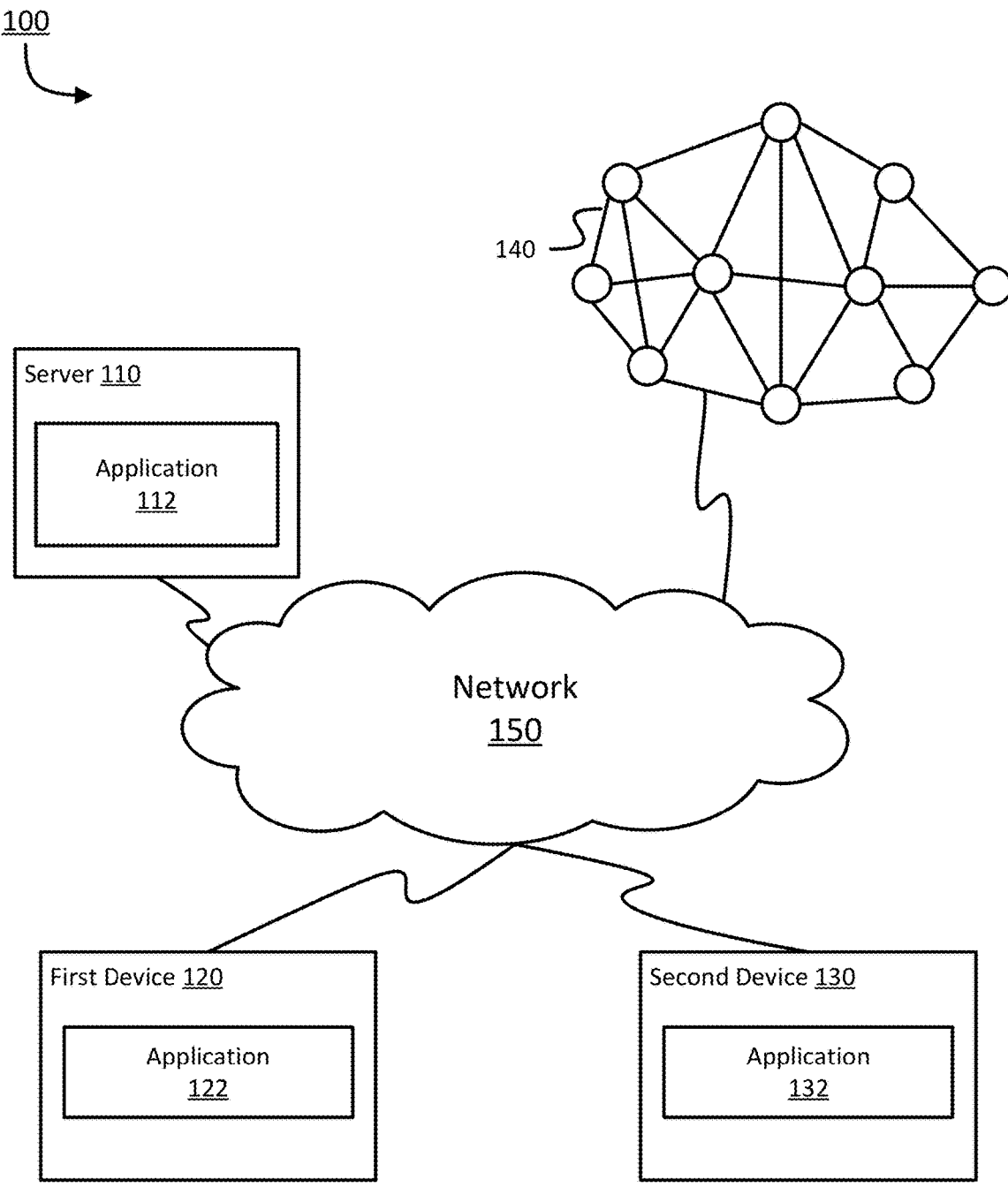

FIG. 1B shows an example of a system 100 comprising a first server 110, a first entity 120, a second entity 130, and a ledger 140 interconnected via a network 150.

Server 110 may be any server capable of executing application 112. In this regard, server 110 may be a standalone server, a corporate server, or a server located in a server farm or cloud-computer environment. According to some examples, server 110 may be a virtual server hosted on hardware capable of supporting a plurality of virtual servers. As noted above, server 110 may execute application 112. Application 112 may be server-based software configured to provide or execute a technology platform that authenticates relationships across a resource's lifecycle, digitally verifies data from shared sources, validates compliance, and/or identifies potential fraud. Application 112 may allow one or more tenant organizations to register with the technology platform. A tenant organization may comprise one or more users that create the record to be stored on a ledger, as described in greater detail below with respect to FIG. 6. In this regard, a tenant organization may be a legal or juristic entity that touches, or otherwise comes into contact, with a resource during the resource's lifecycle. The application 112 may receive a record to be written to a ledger, such as the ledger 140, from a computing device associated with a first device associated with the tenant organization. The record may comprise a unique code and a transaction identification. The transaction identifier may indicate a transaction associated with the record. The record may also comprise one or more identifiers associated with one or more second users who are authorized to approve the record. The identifiers may comprise a phone number (e.g., cell phone number), email address, a username, etc. Additionally or alternatively, the record may comprise a different unique code for each of a plurality of approving devices (e.g., devices associated with users authorized to review the record). Upon receiving the record, the application 112 may notify the one or more second users of the tenant organization that the one or more second users have a record for their review. The notification may be sent via an electronic communication, such as digital message, API call, file input, asynchronous data communication, synchronous communication, email communication, push notification, etc. The notification may comprise the unique code and the transaction identifier. The application 112 may receive one or more verifications of the unique code and the transaction identifier from the one or more second users. If a consensus of the one or more second users verify the transaction, the application 112 may write (e.g., commit) the record to the ledger (e.g., ledger 140). The application 112 may sign the record prior to writing the record to the ledger. In this regard, the application 112 may act as a proxy node to create a local permission system within a global permission system of the ledger. Additionally or alternatively, the application 112 may execute a private ledger that allows the record to be validated by the one or more second users. After the record is validated, the application 112 may write (e.g., commit) the record to a public ledger. In some examples, the private ledger and public ledger may form a hybrid ledger accessible by third parties.

Additionally or alternatively, the application 112 may comprise logic that reads and/or writes to the network and/or the ledger 140. The logic may comprise a chemical analysis component that analyzes the chemical composition of the resource, for example, using the process described in U.S. application Ser. No. 17/722,906, filed on Apr. 18, 2022 and entitled "Machine-Learning-Based Chemical Analysis," the entirety of which is herein incorporated by reference in its entirety. The logic may consider a variety of factors to determine whether the chemical composition of the resource has changed, including, for example, time, temperature, changes in temperature, sedimentation, humidity, light exposure, oxidation, etc. If the chemical composition of the resource has changed, the application 112 may create a new record for the resource that indicates the change to the resource. The chemical composition logic may run periodically (e.g., hourly, daily, weekly, monthly, etc.). Additionally or alternatively, the chemical composition logic may generate an alert, for example, if the change in the chemical composition of the resource presents a danger (e.g., health risk, fire risk, etc.). In some examples, the application 112 may invoke one or more smart contracts on the ledger 140. The one or more smart contracts may record a new record on the ledger 140 or change an existing record on the ledger 140.

Additionally or alternatively, the application 112 may be configured to create (e.g., derive) one or more tokens based on the analysis of the chemical composition of the resource. The one or more tokens may represent one or more chemical properties, elemental properties, elemental components, parametric components, and/or molecular components of the resource. For example, a first record may be measured and/or analyzed to determine the chemical properties, elemental properties, elemental components, parametric components, and/or molecular components of the resource. In response to the measurements and/or analysis, the application 112 may generate one or more tokens. The one or more tokens may be ERC-20 tokens, ERC-721 tokens, ERC-155 tokens, or any other suitable non-fungible token or cryptocurrency. The tokens may represent one or more chemical properties of the resource. As noted in an example above, the resource may be petroleum, and the one or more tokens may represent the carbon, hydrogen, nitrogen, oxygen, sulfur, and/or metals contained in the petroleum. As the resource is processed and/or consumed, the chemical and/or molecular composition of the resource may change. Accordingly, the one or more tokens may be decremented to represent the changes in the chemical and/or molecular composition of the resource. Additionally or alternatively, the changes in the chemical and/or molecular composition of the resources may reallocate one or more values contained in the token. For example, a first token may be decremented an amount of carbon consumed in the production of plastic. A second token may be allocated the amount of carbon decremented from the first token. If the second token does not exist at the time of the carbon is deducted from the first token, the application 112 may generate the second token to represent the chemical and/or molecular composition of the plastic. The one or more tokens may be decremented upon consumption of the resource, for example, based on the use of the element or compounds' consumption potential (normative versus physics potentials). Efficient consumption may leave in non-destroyed potential in the first token, which may result in non-total destruction of the one or more tokens. If the resource is consumed, lost, or made into a final sequestered form, a token may be destroyed to the extent that the token's consumable potential is used and/or destroyed. Continuing the example above, the carbon remaining in the first token may constitute the non-destroyed potential, which may cause the first token to continue to exist due to the residual carbon contained therein.

In some embodiments, the application 112 may provide the one or more tokens to a digital currency exchange (e.g., a cryptocurrency exchange). The one or more tokens may be tied to and/or represent the fungible commodity, while being configured to be exchanged via the digital currency exchange. As tokens based on this technology and/or methodology represent commodities which may change over the course of their lifecycle and the physical and/or intangible commodities may be commercially modified, exchanged, entitled, and/or sold, the one or more tokens may be utilized in any such exchange, including a terminal exchange, which include, but are not limited to, destruction, sequestration, recycling, disposal, or a combination thereof. Alternatively, the application 112 may comprise a digital currency exchange (e.g., a cryptocurrency exchange). In this regard, the one or more tokens may be bought, sold, traded, etc. By offering the one or more tokens on a digital currency exchange, the one or more tokens may be used as part of a carbon offsetting and/or abatement program. That is, the one or more tokens may represent a carbon credit program that allows entities to buy, sell, or trade carbon credits.

The application 112 may also comprise artificial intelligence. The artificial intelligence may comprise one or more machine learning models. The one or more machine learning models may comprise a neural network, such as a convolutional neural network (CNN), a recurrent neural network, a recursive neural network, a long short-term memory (LSTM), a gated recurrent unit (GRU), an unsupervised pre-trained network, a space invariant artificial neural network, a generative adversarial network (GAN), or a consistent adversarial network (CAN), such as a cyclic generative adversarial network (C-GAN), a deep convolutional GAN (DC-GAN), GAN interpolation (GAN-INT), GAN-CLS, a cyclic-CAN (e.g., C-CAN), or any equivalent thereof. Additionally or alternatively, the machine learning model may comprise one or more decisions trees.

The artificial intelligence may be trained to review and/or analyze (e.g., extract) the records stored in the ledger to identify the parties and/or processes, identify relationships between various resources and/or data stored in the ledger, authenticate relationships across a resource's lifecycle, digitally verify data from shared sources, validate compliance with laws and regulations, and/or identify potential fraud. The one or more machine learning models may be trained using supervised learning, unsupervised learning, back propagation, transfer learning, stochastic gradient descent, learning rate decay, dropout, max pooling, batch normalization, long short-term memory, skip-gram, or any equivalent deep learning technique. Once the one or more machine learning models are trained, the one or more machine learning models may be exported and/or deployed in application 112. The application 112 may then analyze and/or review the records in the ledger (such as a blockchain) to reduce the risk associated with one or more resources.

First device 120 may be any device associated with a tenant organization. First device 120 may be a mobile device, such as a cellular phone, a mobile phone, a smart phone, a tablet, a laptop, or an equivalent thereof. Additionally or alternatively, first device 120 may comprise a desktop computer or, alternatively, a virtual computer. First device 120 may provide a first user, associated with a tenant organization, with access to various applications and/or services. For example, first device 120 may provide the first user with access to the Internet. Additionally, first device 120 may provide the first user with one or more applications ("apps") located thereon. The one or more applications may provide the first user with a plurality of tools and access to a variety of services. In some examples, the one or more applications may include an application 122. Application 122 may be a client-based application corresponding to the application 112. In this example, the application 122 may create a record to write to the ledger, for example, as discussed in greater detail below with respect to FIG. 6. The application 122 may flag the record as temporary. Additionally, the application 122 may add metadata to the record. The metadata may comprise the unique code, the transaction identifier, and/or the one or more second users designated to approve the record. In some examples, the application 122 may obfuscate and/or encrypt the metadata. The application 122 may send the record, flagged as temporary, to the server 110. The server may then send the record to the one or more second users identified in the metadata so that the one or more second users can verify (or deny) the record. Additionally or alternatively, the application 122 may receive an indication of one or more records that require review. In this regard, the first device 120 and/or the application 122 may receive a unique code and a transaction identifier of a record that requires review. The application 122 may retrieve the record, for example, using the transaction identifier. The record may be retrieved from the server 110, the application 112, a private ledger (e.g., database) (not shown), the ledger 140, or any combination thereof. Upon receiving the record, the first device 120 (e.g., application 122 executing on first device 120) may compare the unique code with a unique code stored with the record. If the codes match, the application 122 may provide a notification to the server 110 (e.g., the application 112 executing on the server 110) that the record is verified. Similarly, if the codes do not match, the application 122 may provide a notification to the server 110 (e.g., the application 112 executing on the server 110) that the record is not verified. As noted above, the application 112 may track the verifications and, if a consensus (e.g., a predetermined number of approving devices) is reached, write the record to the ledger 140. Additionally or alternatively, the application 122 may invoke one or more smart contracts to record a new record on the ledger 140 or change an existing record on the ledger 140.

The second device 130 may be another device associated with the tenant organization. In this regard, the second device 130 may be any of the devices discussed above with respect to the first device 120. Similarly, the second device 130 may execute application 132, which may be provide similar functionality to the functionality described above with respect to the application 122.

The ledger 140 may be any suitable ledger. For example, the ledger 140 may comprise a public blockchain, a private blockchain, a hybrid blockchain, a distributed database, an immutable database, a distributed ledger, etc. The ledger 140 may store the records associated with the one or more resources. Additionally or alternatively, the ledger 140 may store the one or more smart contracts referred to herein. The ledger 140 may be a declarable blockchain. Additionally or alternatively, the ledger 140 may be a discoverable blockchain, wherein interrelationships between blocks of data stored in the ledger 140 may be identified, for example, using recursive analysis of the blocks stored in ledger 140. As described in greater detail below, this may allow computing devices to perform a forensic analysis of the data contained in the blocks. The forensic analysis may help to identify the source of a resource and/or how the resource has changed or been modified since the resource was originally extracted.

Network 150 may include any type of network. In this regard, the network 150 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
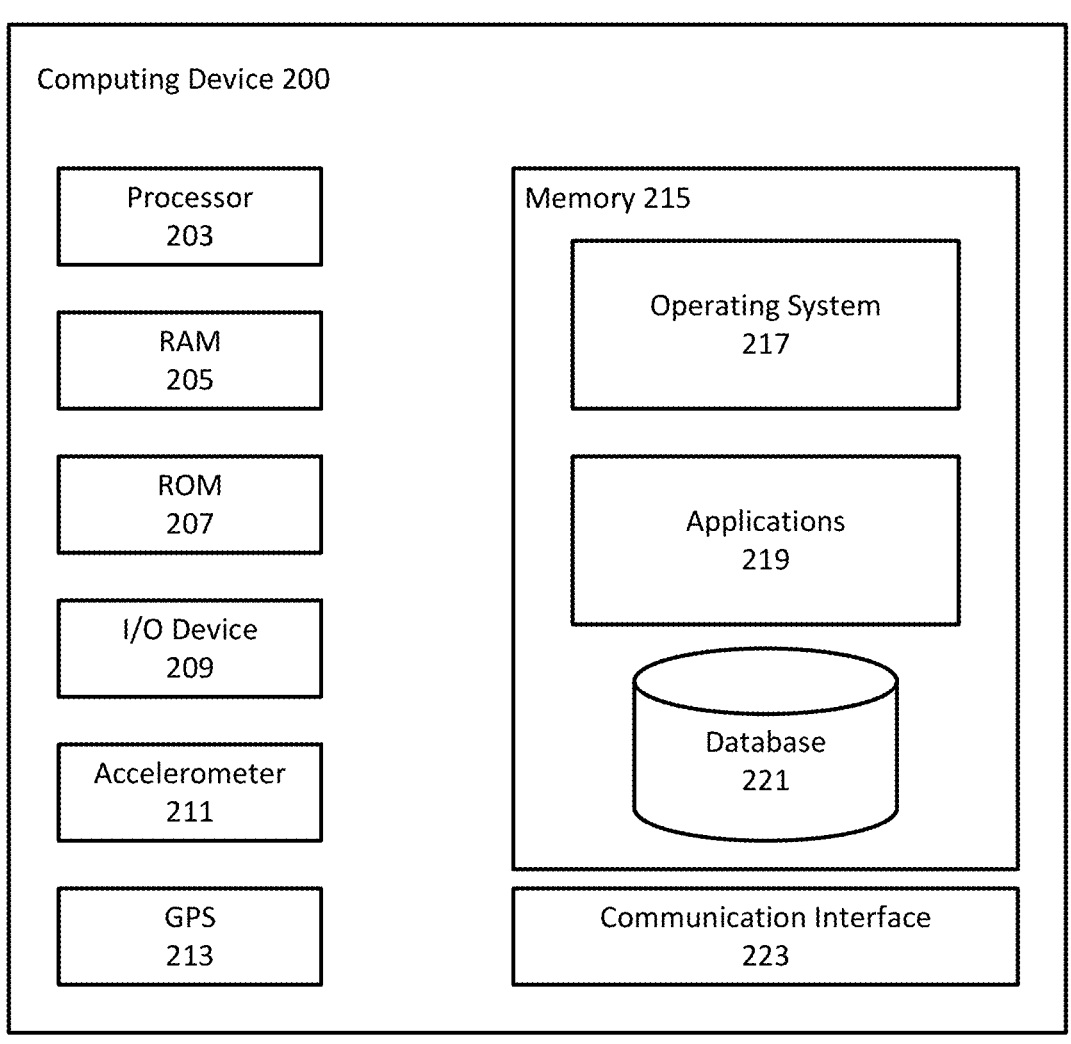
FIG. 2 shows an example of a computing device in accordance with one or more aspects of the disclosure.

Any of the devices and systems described herein may be implemented, in whole or in part, using one or more computing devices described with respect to FIG. 2. Turning now to FIG. 2, a computing device 200 that may be used with one or more of the computational systems is described. The computing device 200 may comprise a processor 203 for controlling overall operation of the computing device 200 and its associated components, including RAM 205, ROM 207, input/output device 209, accelerometer 211, global-position system antenna 213, memory 215, and/or communication interface 223. A bus 202 may interconnect processor(s) 203, RAM 205, ROM 207, memory 215, I/O device 209, accelerometer 211, global-position system receiver/antenna 213, memory 215, and/or communication interface 223. Computing device 200 may represent, be incorporated in, and/or comprise various devices such as a desktop computer, a computer server, a gateway, a mobile device, such as a laptop computer, a tablet computer, a smart phone, any other types of mobile computing devices, and the like, and/or any other type of data processing device.

Input/output (I/O) device 209 may comprise a microphone, keypad, touch screen, and/or stylus through which a user of the computing device 200 may provide input, and may also comprise one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may comprise volatile and nonvolatile, removable and non-removable media implemented in any method or technology for storage of information such as computer-readable instructions, data structures, program modules, or other data. Memory 215 may comprise one or more physical persistent memory devices and/or one or more non-persistent memory devices. Memory 215 may comprise random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user.

Communication interface 223 may comprise one or more transceivers, digital signal processors, and/or additional circuitry and software, protocol stack, and/or network stack for communicating via any network, wired or wireless, using any protocol as described herein.

Processor 203 may comprise a single central processing unit (CPU), which may be a single-core or multi-core processor, or may comprise multiple CPUs. Processor(s) 203 and associated components may allow the computing device 200 to execute a series of computer-readable instructions (e.g., instructions stored in RAM 205, ROM 207, memory 215, and/or other memory of computing device 215, and/or in other memory) to perform some or all of the processes described herein. Although not shown in FIG. 2, various elements within memory 215 or other components in computing device 200, may comprise one or more caches, for example, CPU caches used by the processor 203, page caches used by the operating system 217, disk caches of a hard drive, and/or database caches used to cache content from database 221. A CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For example, in a multi-tiered application, a database cache on an application server may reduce data retrieval and data manipulation time by not needing to communicate over a network with a back-end database server. These types of caches and others may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the disclosure.

Figure 3:
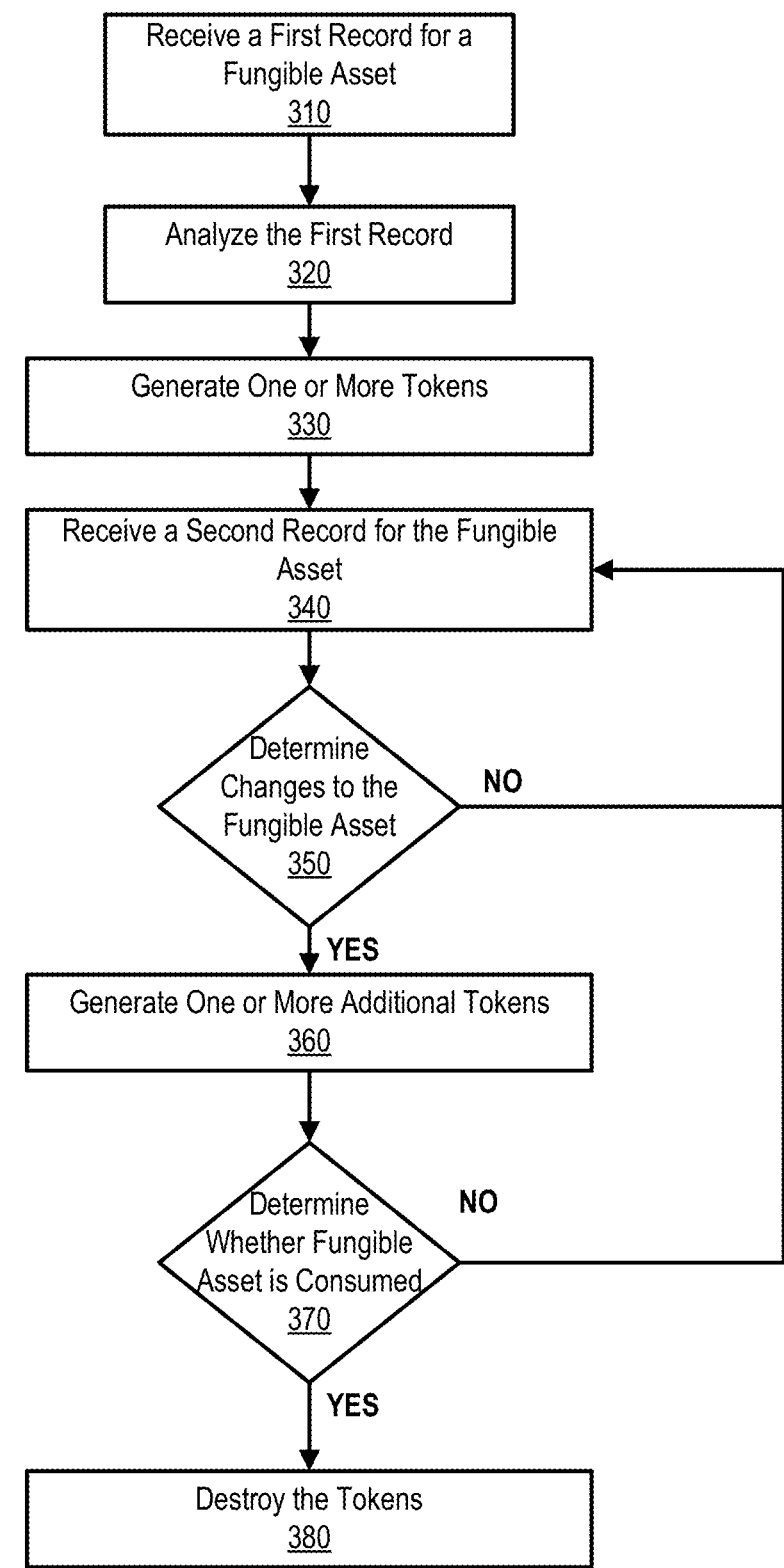
FIG. 3 shows an example of creating and managing the property right in the chemical properties, elemental properties, elemental components, parametric components, and/or molecular components of resources in accordance with one or more aspects of the disclosure.

A property right in the chemical properties, elemental properties, elemental components, parametric components, and/or molecular components of resources may be created that is separate from the ownership of the resource itself. FIG. 3 shows an example of a process for creating and/or managing the property right in the chemical properties, elemental properties, elemental components, parametric components, and/or molecular components of resources in accordance with one or more aspects of the disclosure. Some or all of the steps of process 300 may be performed using one or more computing devices as described herein, including, for example, the server 110, the first device 120, the second device, the computing device 200, or any combination thereof.

In step 310, a first record for a fungible asset may be received. The first record may be generated using the techniques described in U.S. application Ser. No. 17/722, 759, filed on Apr. 18, 2022 and entitled "Multi-Tenant Node on a Private Network of Distributed, Auditable, and Immutable Databases," the entirety of which is herein incorporated by reference in its entirety. The first record may be stored in a ledger (e.g., a distributed ledger, a public blockchain, a private blockchain, a hybrid blockchain, etc.). The fungible asset may be any commodity or resource, including, for example, ores and/or raw materials, such as oil, coal, petroleum, chemicals, etc. The first record may be received as part of a new addition to the ledger. That is, a computing device may receive the record from one or more entities that are writing the first record (e.g., as a data block) to the ledger. Additionally or alternatively, the computing device may obtain the record, for example, via a review of the records stored in the ledger. In this regard, the computing device may use a scraping algorithm to obtain one or more records stored on a ledger. The record may comprise at least one of a transaction identifier, an asset identifier, an indication of the resource (e.g., commodity), and/or other data and/or information. The other data and/or information may comprise a digital DNA, or fingerprint, of the resource (e.g., commodity) at each change and/or transaction. That is, the other data and/or information may create an ancestry of the movement and/or lifecycle of the resource (e.g., commodity). Additionally or alternatively, the data and/or information may comprise a last known holder of the resource, movement and/or location of the resource, exact parameter measurements, historic and back-tested knowledge of the efficiency potential of each parametric element, formula, or content, etc. of the resource.

In step 320, the computing device may analyze the first record. In this regard, the computing device may measure and/or analyze the resource to determine the chemical composition of the resource. In particular, the computing device may determine one or more chemical properties, elemental properties, elemental components, parametric values, and/or molecular values of the resource. FIG. 4 shows an example of the chemical properties, elemental properties, elemental components, parametric components, and/or molecular components of resources that is separate from the ownership of the resource itself. As shown in FIG. 4, the computing device may analyze a record to determine the current parameters (e.g., chemical properties, elemental properties, elemental components, parametric values, and/or molecular values) of the resource. The record may also comprise the received parameters from, for example, a previous location. The record may also comprise the commodity change state (e.g., a resource type, a current location of the resource, and a quantity of the resource).

To determine the current parameters of the resource, the computing device may evaluate a variety of factors, for example, using the artificial intelligence described above. The factors may include one or more of time, temperature, sedimentation, humidity, light exposure, oxidation, etc. of the resource, how it was stored, where it was stored, etc. The chemical composition analysis may be performed periodically (e.g., hourly, daily, weekly, monthly, etc.). Periodic analysis of the chemical properties, elemental properties, elemental components, parametric properties, and/or molecular properties of the resource may be performed more frequently, for example, if the resource is being transported.

In step 330, the computing device may generate one or more tokens for the first record. The one or more tokens may establish a property right in the chemical properties, elemental properties, elemental components, parametric components, and/or molecular components of the resource that is separate from the ownership right of the resource. The property right may allow a third party (e.g., not the owner of the resource) to buy, sell, or trade the rights in the resource or other property. As noted above, this property right may be used as part of a carbon offsetting and/or abatement program. Additionally or alternatively, the property right may be used in other commodity and secondary commercial exchange markets or programs or other property or exchange rights, such as those that may be employed in a commercial exchange. The one or more tokens may be ERC-20 tokens, ERC-721 tokens, ERC-155 tokens, or any other suitable non-fungible token. As noted above, the one or more tokens may represent one or more chemical properties, elemental properties, elemental components, parametric components, and/or molecular components of the resource. For example, the one or more tokens may correspond to the individual elements and/or molecules contained in the resource. For petroleum, the one or more first tokens may represent how much carbon, hydrogen, nitrogen, oxygen, sulfur, and/or metals is contained in the petroleum. Each of the carbon, hydrogen, nitrogen, oxygen, sulfur, and/or metals may be represented as a value in the one or more first tokens. Additionally or alternatively, each of the one or more tokens may represent an individual element or a molecule type contained in the resource. For example, if the resource is petroleum, a first token of the one or more tokens may comprise an indication of an amount of carbon contained in the petroleum, and a second token of the one or more tokens may comprise an indication of an amount of hydrogen contained in the petroleum.

In step 340, a second record for the fungible asset may be received. The second record may be stored in a ledger (e.g., a distributed ledger, a public blockchain, a private blockchain, a hybrid blockchain, etc.). The second record may be received as part of a new addition to the ledger (e.g., as the next data block of the first record). That is, a computing device may receive the second record from one or more entities that are writing the first record (e.g., as a data block) to the ledger. Additionally or alternatively, the computing device may obtain the second record, for example, via a review of the records stored in the ledger. The review may be performed periodically, for example, by the artificial intelligence described above. The second record may comprise data and/or information of the resource. The data and/or information of the resource in the second record may be the same as or different from the data and/or information of the resource in the first record. For example, the second record may comprise information indicating one or more changes that have occurred to the resource. The information may indicate that the resource has been transported to a different location and an amount of the resource (e.g., weight or quantity of individual elements or molecules contained in the resource). The one or more changes may comprise processing of the resource (e.g., refining, parsing, distributing, etc.), consuming the resource (e.g. in whole or in part), destroying the resource (e.g., burning in the case of oil), and/or sequestering the fungible asset (e.g., making plastic). The one or more changes may indicate changes to the amount of individual elements or molecules contained in the resource. In step 350, the computing device may determine if one or more changes have occurred to the fungible asset. If no changes are determined (e.g., detected), then the process may loop back to step 340. However, if the computing device determines that one or more changes have occurred to the fungible asset, the process may proceed to step 360. The computing device may determine whether one or more changes have occurred to the fungible asset based on a comparison of the first record and the second record. The comparison may be performed using machine learning techniques described above. For example, one or more machine learning models may be built to determine (e.g., predict) the chemical composition of the resource at different stages of transportation based on historical data.

In step 360, the computing device may generate one or more additional tokens. The one or more additional tokens may be generated, for example, based on the determined one or more changes. Continuing the example above, the fungible asset associated with the one or more first tokens may comprise petroleum. The petroleum may be burned as fuel, for example, as it is transported to a destination. When the petroleum reaches its destination, a new record (e.g., the second record) may be recorded with respect to the petroleum. The new record may reflect the amount of petroleum burned in transit. Additionally or alternatively, the new record may reflect changes in the state of the petroleum due to the conditions (e.g., temperature, humidity, sunlight, etc.) while in-transit. Based on the changes to the petroleum, the computing device may generate one or more additional tokens that indicate that the one or more values comprised in the one or more tokens may be decremented. In this regard, the amount of at least one of the carbon, hydrogen, nitrogen, oxygen, sulfur, and/or metals in the petroleum may be decremented to reflect the changes that occurred to the petroleum while it was in-transit. The one or more non-fungible tokens may comprise information indicating an amount of a chemical element of the fungible asset at a first time, and the one or more additional token property information may comprise information indicating the changed amount of the chemical element at a different time.

The computing device may invoke a smart contract to generate the one or more additional tokens based on the determined one or more changes. A smart contract may be a self-executing computer program or transaction protocol stored on the ledger. The smart contract may execute actions when predetermined conditions are met. For example, the smart contract may include code that instructs the computing device to automatically generate one or more additional tokens and write (e.g., mint) the one or more additional tokens to the ledger based on the determined one or more changes. To record the one or more changes, the smart contract may create new segregate tokens tied to the original token. The new segregate tokens may represent the one or more changes. In another example, the smart contract may replace and/or update information contained in the original token. For example, the smart contract may change the origin and replace the origin with a new origin. Additionally or alternatively, the smart contract may update information in the token, including, for example, the chemical properties, elemental properties, elemental components, parametric components, and/or molecular components of the resource. In yet another example, the smart contract may create a new token to replace the old (e.g., original, previous, earlier, parent, etc.) token. The new token may contain and/or represent the new segregate token, as well as the original token(s). Once generated, the one or more additional tokens may be stored in the ledger (e.g., appended to a blockchain as one or more data blocks). The smart contract may comprise information indicating how the additional tokens are generated based on particular resources, and/or different stages of transportation.

In step 370, the computing device may determine whether the fungible asset is consumed in whole. For example, the computing device may determine whether the resource is consumed (e.g., burned as fuel) or sequestered (e.g., used to make plastic). This determination may be made based on the determined one or more changes to the resource. For example, if the new record (e.g., the second record) reflects that the entire fungible asset (e.g., petroleum) has been consumed (e.g., burned as fuel), the computing device may determine that the fungible asset is consumed in whole. As a result, the computing device may determine that the amount of individual elements in the fungible asset (e.g., the carbon, hydrogen, nitrogen, oxygen, sulfur, and/or metals in the petroleum) may also have been consumed in whole. If the computing device determines that the fungible asset has been consumed in whole, the process may proceed to step 370. If the computing device determines that the fungible asset has not been consumed in whole, the process may loop back to step 340.

In step 380, the computing device may destroy the tokens. For example, based on a determination that the fungible asset has been consumed in whole, the computing device may destroy or decrement the one or more tokens, the one or more additional tokens, and/or other tokens associated with the fungible asset. The computing device may destroy (e.g., burn) the tokens by removing the tokens entirely from the ledger. But the actions (e.g., transactions) of destroying the tokens may be recorded on the ledger. Different methods may be used to destroy the tokens. For example, the tokens may be deliberately sent to an invalid address (e.g., null address, burn address), or its properties updated to reflect null available value, and thus the tokens may be considered unusable. The computing device may define or otherwise determine a consensus mechanism (e.g., proof-of-burn (PoB)) for destroying the tokens and/or the conditions for destroying the tokens.

By analyzing the chemical properties, elemental properties, elemental components, parametric components, and/or molecular components of resources and creating a property right therein, the consumption and/or sequestration of the resources may be tracked more thoroughly and accurately. This may allow for more efficient use of the chemical properties, elemental properties, elemental components, parametric components, and/or molecular components of resources, thereby resulting in greener and/or more efficient technologies. Additionally, the property right in the chemical properties, elemental properties, elemental components, parametric components, and/or molecular components of resources may be purchased, sold, traded, transacted, and/or otherwise exchanged. The transactions associated with the property rights in in the chemical properties, elemental properties, elemental components, parametric components, and/or molecular components of resources may be used, for example, as part for carbon offsets.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language, such as (but not limited to) Perl, Python, or any suitable scripting language. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although certain specific aspects of various example embodiments have been described, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. Thus, embodiments disclosed should be considered in all respects as examples and not restrictive. Accordingly, the scope of the inventions herein should be determined not by the embodiments illustrated, but by the appended claims and their equivalents.

The invention claimed is:

1. A method comprising:

training, by a computing device and based on training data, a machine learning model to predict of a chemical composition of a fungible asset at different stages of transportation;

receiving, by the computing device and from a distributed ledger, a first record for a fungible asset, wherein the fungible asset is petroleum;

generating, by the computing device, one or more non-fungible tokens for the first record, wherein the one or more non-fungible tokens comprise values representing a first chemical composition of the fungible asset;

analyzing, by the computing device and using a scraping algorithm, the distributed ledger to identify one or more records associated with the fungible asset;

identifying, by the computing device and based on the analysis of the distributed ledger, a second record associated with the fungible asset, wherein the second record comprises a second chemical composition of the fungible asset;

invoking, by the computing device, a smart contract to determine one or more changes to the chemical composition of the fungible asset between the first record and the second record, wherein the smart contract comprises a self-executing computer program stored on the distributed ledger and configured to mint new tokens in response to one or more conditions being met;

in response to the smart contract being invoked, comparing, using the machine learning model, the first record and the second record to identify one or more changes to the chemical composition of the fungible asset;

generating, based on one or more identified changes to the chemical composition of the fungible asset, one or more additional non-fungible tokens, wherein the one or more additional tokens represent the one or more changes in the chemical composition of the fungible asset between the first record and the second record; and writing, by the computing device, the one or more additional non-fungible tokens to the distributed ledger, wherein the one or more additional non-fungible tokens comprise:

a first indication of a property right in the chemical properties, elemental properties, elemental components, parametric components, and/or molecular components of the fungible asset, a second indication of an ownership right in the physical fungible asset, and the property right is separate from the ownership right.

2. The method of claim 1, wherein the one or more non-fungible tokens comprise a value representing an amount of a chemical element of the fungible asset, and the one or more additional non-fungible tokens comprise a value indicating that the amount of the chemical element of the fungible asset is decremented.

3. The method of claim 1, further comprising:

determining, based on the one or more identified changes, that the fungible asset has been consumed; and destroying, based on a determination that the fungible asset has been consumed, the one or more non-fungible tokens and the one or more additional non-fungible tokens.

4. The method of claim 1, wherein:

the first record comprises information indicating individual chemical elements or individual molecular components of the fungible asset, and each of the one or more non-fungible tokens comprises a value corresponding to each of the individual chemical elements or each of the individual molecular components of the fungible asset.

5. The method of claim 1, wherein the chemical composition of the fungible asset comprises at least one of:

one or more chemical properties, elemental properties, elemental components, parametric components, or molecular components of the fungible asset.

6. The method of claim 1, wherein:

a first token of the one or more non-fungible tokens comprises information indicating an amount of carbon contained in the petroleum, and a second token of the one or more non-fungible tokens comprises information indicating an amount of hydrogen contained in the petroleum.

7. The method of claim 1, wherein:

each of the one or more non-fungible tokens comprises information indicating an amount of a chemical element of the fungible asset at a first time, and each of the one or more additional non-fungible tokens comprises information indicating a remaining amount of the chemical element of the fungible asset at a second time.

8. An apparatus comprising:

one or more processors; and memory storing instructions that, when executed by the one or more processors, cause the apparatus to:

train, based on training data, a machine learning model to predict of a chemical composition of a fungible asset at different stages of transportation;

receive, from a distributed ledger, a first record for a fungible asset, wherein the fungible asset is petroleum;

generate one or more non-fungible tokens for the first record, wherein the one or more non-fungible tokens comprise values representing a first chemical composition of the fungible asset;

analyze, using a scraping algorithm, the distributed ledger to identify one or more records associated with the fungible asset;

identify, based on the analysis of the distributed ledger, a second record associated with the fungible asset, wherein the second record comprises a second chemical composition of the fungible asset;

invoke a smart contract to determine one or more changes to the chemical composition of the fungible asset between the first record and the second record, wherein the smart contract comprises a self-executing computer program stored on the distributed ledger and configured to mint new tokens in response to one or more conditions being met;

in response to the smart contract being invoked, compare, using the machine learning model, the first record and the second record to identify one or more changes to the chemical composition of the fungible asset;

generate, based on the one or more identified changes to the chemical composition of the fungible asset, one or more additional non-fungible tokens, wherein the one or more additional tokens represent the one or more changes in the chemical composition of the fungible asset between the first record and the second record; and write the one or more additional non-fungible tokens to the distributed ledger, wherein the one or more additional non-fungible tokens comprise:

a first indication of a property right in the chemical properties, elemental properties, elemental components, parametric components, and/or molecular components of the fungible asset, a second indication of an ownership right in the physical fungible asset, and the property right is separate from the ownership right.

9. The apparatus of claim 8, wherein the one or more non-fungible tokens comprise a value representing an amount of a chemical element of the fungible asset, and the one or more additional non-fungible tokens comprise a value indicating that the amount of the chemical element of the fungible asset is decremented.

10. The apparatus of claim 8, wherein instructions, when executed by the one or more processors, cause the apparatus to:

determine, based on the one or more identified changes, that the fungible asset has been consumed; and destroy, based on a determination that the fungible asset has been consumed, the one or more non-fungible tokens and the one or more additional non-fungible tokens.

11. The apparatus of claim 8, wherein:

the first record comprises information indicating individual chemical elements or individual molecular components of the fungible asset, and each of the one or more non-fungible tokens comprises a value corresponding to each of the individual chemical elements or each of the individual molecular components of the fungible asset.

12. The apparatus of claim 8, wherein the chemical composition of the fungible asset comprises at least one of:

one or more chemical properties, elemental properties, elemental components, parametric components, or molecular components of the fungible asset.

13. The apparatus of claim 8, wherein:

a first token of the one or more non-fungible tokens comprises information indicating an amount of carbon contained in the petroleum, and a second token of the one or more non-fungible tokens comprises information indicating an amount of hydrogen contained in the petroleum.

14. The apparatus of claim 8, wherein:

each of the one or more non-fungible tokens comprises information indicating an amount of a chemical element of the fungible asset at a first time, and each of the one or more additional non-fungible tokens comprises information indicating a remaining amount of the chemical element of the fungible asset at a second time.

15. A non-transitory computer readable medium storing instructions that, when executed, cause:

training, based on training data, a machine learning model to predict of a chemical composition of a fungible asset at different stages of transportation;

receiving, from a distributed ledger, a first record for a fungible asset, wherein the fungible asset is petroleum;

generating one or more non-fungible tokens for the first record, wherein the one or more non-fungible tokens comprise values representing a first chemical composition of the fungible asset;

identifying, based on the analysis of the distributed ledger, a second record associated with the fungible asset, wherein the second record comprises a second chemical composition of the fungible asset;

invoking a smart contract to determine one or more changes to the chemical composition of the fungible asset between the first record and the second record, wherein the smart contract comprises a self-executing computer program stored on the distributed ledger and configured to mint new tokens in response to one or more conditions being met;

in response to the smart contract being invoked, comparing, using the machine learning model, the first record and the second record to identify one or more changes to the chemical composition of the fungible asset;

generating, based on one or more identified changes to the chemical composition of the fungible asset, one or more additional non-fungible tokens, wherein the one or more additional tokens represent the one or more changes in the chemical composition of the fungible asset between the first record and the second record; and writing the one or more additional non-fungible tokens to the distributed ledger, wherein the one or more additional non-fungible tokens comprise:

a first indication of a property right in the chemical properties, elemental properties, elemental components, parametric components, and/or molecular components of the fungible asset, a second indication of an ownership right in the physical fungible asset, and the property right is separate from the ownership right.

16. The non-transitory computer readable medium of claim 15, wherein the one or more non-fungible tokens comprise a value representing an amount of a chemical element of the fungible asset, and the one or more additional non-fungible tokens comprise the value indicating that the amount of a chemical element of the fungible asset is decremented.

17. The non-transitory computer readable medium of claim 15, wherein the instructions, when executed, cause:

determining, based on the one or more identified changes, that the fungible asset has been consumed; and destroying, based on a determination that the fungible asset has been consumed, the one or more non-fungible tokens and the one or more additional non-fungible tokens.

18. The non-transitory computer readable medium of claim 15, wherein:

the first record comprises information indicating individual chemical elements or individual molecular components of the fungible asset, and each of the one or more non-fungible tokens comprises a value corresponding to each of the individual chemical elements or each of the individual molecular components of the fungible asset.

19. The non-transitory computer readable medium of claim 15, wherein the chemical composition of the fungible asset comprises at least one of:

one or more chemical properties, elemental properties, elemental components, parametric components, or molecular components of the fungible asset.

20. The non-transitory computer readable medium of claim 15, wherein:

a first token of the one or more non-fungible tokens comprises information indicating an amount of carbon contained in the petroleum, and a second token of the one or more non-fungible tokens comprises information indicating an amount of hydrogen contained in the petroleum.

* * * * *